United States Patent
Miyata et al.

(10) Patent No.: US 10,453,045 B2
(45) Date of Patent: Oct. 22, 2019

(54) POS TERMINAL, PRODUCT INFORMATION REGISTRATION METHOD, AND NON-TRANSITORY COMPUTER READABLE MEDIUM STORING PRODUCT INFORMATION REGISTRATION PROGRAM

(71) Applicant: NEC Platforms, Ltd., Kawasaki-shi, Kanagawa (JP)

(72) Inventors: Kotaro Miyata, Kanagawa (JP); Daiki Chiba, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 325 days.

(21) Appl. No.: 15/528,535

(22) PCT Filed: Jan. 26, 2016

(86) PCT No.: PCT/JP2016/000376
§ 371 (c)(1),
(2) Date: May 22, 2017

(87) PCT Pub. No.: WO2016/136138
PCT Pub. Date: Sep. 1, 2016

(65) Prior Publication Data
US 2017/0300887 A1   Oct. 19, 2017

(30) Foreign Application Priority Data
Feb. 24, 2015 (JP) .................................. 2015-034190

(51) Int. Cl.
*G06Q 20/20* (2012.01)
*G06F 16/903* (2019.01)
(Continued)

(52) U.S. Cl.
CPC .......... *G06Q 20/20* (2013.01); *G06F 3/0416* (2013.01); *G06F 3/0482* (2013.01);
(Continued)

(58) Field of Classification Search
CPC .. G06F 3/0416; G06F 16/90335; G06F 3/167; G06F 3/0488; G06F 3/0482;
(Continued)

(56) References Cited

U.S. PATENT DOCUMENTS 5,758,322 A * 5/1998 Rongley ............. G06Q 20/341
704/270
5,839,104 A   11/1998 Miller et al.
(Continued)

FOREIGN PATENT DOCUMENTS

CN    101470929 A    7/2009
CN    101876887 A    11/2010
(Continued)

OTHER PUBLICATIONS

Communication dated Jan. 2, 2019, from the State Intellectual Property Office of People's Republic of China in counterpart Application No. 201680003861.2.
(Continued)

*Primary Examiner* — Andrew Joseph Rudy
(74) *Attorney, Agent, or Firm* — Sughrue Mion, PLLC (57) ABSTRACT

The present invention provides a POS terminal that can prevent errors in registering product information relating to a product for sale from occurring when sales processing is performed. The POS terminal is for managing sales information of products at a store. A voice recognition dictionary (5) includes product names of products for sale registered therein. When a product name included in a voice uttered by an operator matches one of the product names registered in the voice recognition dictionary (5), a voice recognition unit (3) outputs the product name included in the voice as a voice-recognized product name. An operator display unit (10) displays product buttons for inputting the product names. When a product name of a product button pressed by
(Continued)

the operator matches the product name voice-recognized by the voice recognition unit (3), product information of a product having the matched product name is registered.

6 Claims, 9 Drawing Sheets

(51) Int. Cl.

| | | |
|---|---|---|
| G07G 1/01 | (2006.01) | |
| G07G 1/12 | (2006.01) | |
| G06F 3/041 | (2006.01) | |
| G06F 3/0481 | (2013.01) | |
| G06F 3/0482 | (2013.01) | |
| G06F 3/0488 | (2013.01) | |
| G06F 3/16 | (2006.01) | |
| G10L 15/08 | (2006.01) | |
| G10L 15/22 | (2006.01) | |
| G07G 1/00 | (2006.01) | |
| G10L 25/51 | (2013.01) | |

(52) U.S. Cl.
CPC ........ *G06F 3/0488* (2013.01); *G06F 3/04817* (2013.01); *G06F 3/167* (2013.01); *G06F 16/90335* (2019.01); *G06Q 20/201* (2013.01); *G07G 1/0009* (2013.01); *G07G 1/0036* (2013.01); *G07G 1/01* (2013.01); *G07G 1/12* (2013.01); *G10L 15/08* (2013.01); *G10L 15/22* (2013.01); *G06F 2203/0381* (2013.01); *G10L 25/51* (2013.01); *G10L 2015/088* (2013.01); *G10L 2015/221* (2013.01); *G10L 2015/223* (2013.01)

(58) Field of Classification Search
CPC ......... G06F 3/04817; G06F 2203/0381; G10L 25/51; G10L 15/22; G10L 15/08; G10L 2015/221; G10L 2015/223; G10L 2015/088; G06Q 20/20; G06Q 20/201; G07G 1/0009; G07G 1/0036; G07G 1/01; G07G 1/12
USPC .................... 705/16–18, 26.1; 235/376–383
See application file for complete search history.

(56) References Cited

U.S. PATENT DOCUMENTS

| | | | | |
|---|---|---|---|---|
| 6,434,530 | B1* | 8/2002 | Sloane | G06Q 20/20 |
| | | | | 235/383 |
| 6,594,632 | B1* | 7/2003 | White | G10L 15/22 |
| | | | | 704/246 |
| 7,003,289 | B1* | 2/2006 | Kolls | G07C 5/008 |
| | | | | 455/422.1 |
| 7,114,656 | B1* | 10/2006 | Garver | A47F 9/048 |
| | | | | 235/462.46 |
| 7,360,239 | B2* | 4/2008 | Mandalia | H04L 63/0861 |
| | | | | 713/186 |
| 8,380,177 | B2* | 2/2013 | Laracey | G06Q 30/0253 |
| | | | | 455/414.1 |
| 8,577,803 | B2* | 11/2013 | Chatterjee | G06Q 20/36 |
| | | | | 705/41 |
| 8,639,214 | B1* | 1/2014 | Fujisaki | G06Q 20/32 |
| | | | | 379/88.03 |
| 9,032,498 | B1* | 5/2015 | Ben Ayed | G06F 21/35 |
| | | | | 726/9 |
| 9,053,510 | B2* | 6/2015 | Crum | G06Q 30/02 |
| 9,773,212 | B2* | 9/2017 | Hammad | G06Q 10/00 |
| 9,830,328 | B2* | 11/2017 | Faith | G06Q 30/06 |
| 9,916,010 | B2* | 3/2018 | Harris | G06F 3/017 |
| 2003/0233279 | A1 | 12/2003 | Shinzaki | |
| 2014/0168130 | A1* | 6/2014 | Hirai | G10L 15/00 |
| | | | | 345/173 |

FOREIGN PATENT DOCUMENTS

| | | |
|---|---|---|
| CN | 203179179 U | 9/2013 |
| JP | 58-189765 A | 11/1983 |
| JP | 2000-249595 A | 9/2000 |
| JP | 2001-317990 A | 11/2001 |
| JP | 2002-056460 A | 2/2002 |
| JP | 2004-086242 A | 3/2004 |
| JP | 2008-186143 A | 8/2008 |
| JP | 2008-186269 A | 8/2008 |
| JP | 2009-163528 A | 7/2009 |

OTHER PUBLICATIONS

International Search Report for PCT/JP2016/000376, dated Mar. 29, 2016.

* cited by examiner

POS TERMINAL, PRODUCT INFORMATION REGISTRATION METHOD, AND NON-TRANSITORY COMPUTER READABLE MEDIUM STORING PRODUCT INFORMATION REGISTRATION PROGRAM

CROSS REFERENCE TO RELATED APPLICATIONS

This is a National Stage of International Application No. PCT/JP2016/000376 filed Jan. 26, 2016, claiming priority based on Japanese Patent Application No. 2015-034190 filed Feb. 24, 2015, the contents of all of which are incorporated herein by reference in their entirety.

TECHNICAL FIELD

The present invention relates to a POS (Point of Sales) terminal, a product information registration method, and a non-transitory computer readable medium storing a product information registration program.

BACKGROUND ART

When a POS (Point of Sales) terminal for managing sales information of products at a store performs sales processing of products for sale, it registers product information (information such as a product name, product code, unit price etc.) usually by scanning barcodes attached to the products. However, the product information cannot be registered by scanning the barcodes if the barcodes are not attached to the products. For this reason, as a technique not requiring the trouble to manually input the product information such as the product names, product codes, and the like for the products that do not have the barcodes attached thereto, there have been techniques suggested for registering the product information of the products for sale by an operator pressing product buttons and for registering the product information of the products for sale by allowing the operator to input the product name by his or her voice.

For example, in regard to the technique for voice input, Patent Literature 1, Japanese Unexamined Patent Application Publication No. 58-189765, titled "Calculation Data Input Scheme" discloses a technique that, in an electronic register, enables product information to be registered by recognizing a predetermined spoken word in a voice uttered by an operator and prohibits product information from being registered by recognizing another predetermined spoken word in the voice uttered by the operator.

Patent Literature 2, Japanese Unexamined Patent Application Publication No. 2000-249595, titled "Product Processing System" discloses a technique that, in a product processing system (measuring and pricing apparatus), accepts information of a product name by voice when a predetermined instruction word is input by voice in order to facilitate voice recognition.

CITATION LIST

Patent Literature

Patent Literature 1: Japanese Unexamined Patent Application Publication No. 58-189765 (pp. 1-2)
Patent Literature 2: Japanese Unexamined Patent Application Publication No. 2000-249595 (pp. 3-4)

SUMMARY OF INVENTION

Technical Problem

In the related art as described above, when the operator presses a product button to input a product name relating to a product having no barcode attached thereto, it has been impossible to avoid errors in registering product information when the operator presses an incorrect product button. Moreover, with a technique for recognizing a voice uttered by an operator saying a product name relating to a product having no barcode attached thereto and inputting the product name, it has been impossible to avoid errors in registering product information when a recognition error occurs. The recognition error is, to be more specific, an error that occurs when a voice is erroneously recognized and an incorrect product name is input.

Object of the Present Invention

The present invention has been made in light of the above circumstances, and an object of the present invention is to provide a POS terminal, a product information registration method, and a product information registration program that can prevent errors in registering product information of a product for sale from occurring when sales processing is performed.

Solution to Problem

In order to solve the above-described problem, a POS terminal, product information registration method, and product information registration program according to the present invention mainly have the following characteristic configurations, respectively.

(1) A POS terminal according to the present invention includes:
a voice recognition dictionary including product names of products for sale registered therein;
voice recognition means for searching for a product name included in a voice uttered by an operator in the voice recognition dictionary, and for outputting, when the product name included in the voice matches one of the product names registered in the voice recognition dictionary, the product name included in the voice as a voice-recognized product name; and
display means with a touch panel for displaying product buttons for the operator to press in order to input the product name of the product for sale.
The product name voice-recognized by the voice recognition means is compared with a product name of a product button pressed by the operator from among the product buttons displayed on the display means, and when the voice-recognized product name matches the product name of the pressed product button, product information of a product having the matched product name is registered.

(2) A product information registration method according to the present invention by using a POS terminal including:
a voice recognition dictionary including product names of products for sale registered therein;
voice recognition means for searching for a product name included in a voice uttered by an operator in the voice recognition dictionary, and for outputting, when the product name included in the voice matches one of the product names registered in the voice recognition dictionary, the product name included in the voice as a voice-recognized product name; and display means with a touch panel for displaying product buttons for the operator to press in order to input the product name of the product for sale. The product information registration method includes;

comparing the product name voice-recognized by the voice recognition means with a product name of a product button pressed by the operator from among the product buttons displayed on the display means; and registering, when the voice-recognized product name matches the product name of the pressed product button, product information of a product having the matched product name.

(3) A non-transitory computer readable medium storing a product information registration program according to the present invention causes a computer to execute the product information registration method according the above (2).

Advantageous Effects of Invention

According to the POS terminal, product information registration method, and non-transitory computer readable medium storing the product information registration program of the present invention, the following effects can be achieved.

When the operator registers the product information of the product for sale by the POS terminal, a result of the voice-recognized product name uttered by the operator is compared with an input result of the product name input by the operator pressing the product button, and if they match, the product information of the product corresponding to the product name is registered. It is therefore possible to prevent errors in registering the product information of the products for sale.

DESCRIPTION OF EMBODIMENTS

Hereinafter, preferred embodiments of a POS terminal, product information registration method, and product information registration program according to the present invention will be described with reference to the attached drawings. In the following descriptions, although the POS terminal and product information registration method according to the present invention will be described, the product information registration method may be carried out as a computer executable product information registration program or the product information registration program may be recorded on a computer readable recording medium. Further, the reference signs shown in the drawings are added to the components for convenience as examples for easier understanding and are not intended to limit the present invention to the illustrated modes.

Features of the Present Invention

An outline of features of the present invention will be described prior to giving descriptions of the embodiments of the present invention. A main feature of the present invention is that, when an operator registers product information of a product for sale on a POS (Point of Sales) terminal, both an input of a product name by recognizing a voice uttered by an operator and an input of a product name by the operator pressing a product button are used, the two product names are compared with each other, and if they match, product information of a product corresponding to the product name is registered.

That is, the main feature of the present invention is to, when product information relating to a product having no barcode attached thereto is registered by the POS terminal, voice-recognize the product name uttered by the operator, and if the product name obtained as a result of the voice recognition matches the product name obtained by the operator pressing the product button displayed on a screen of the POS terminal, register the product name of the product corresponding to the matched product name. Thus, it is possible to prevent errors in registering the product information from occurring.

The features of the present invention will be described in more detail. For example, at the time of performing sales processing by the POS terminal, when the product information of the products such as bread having no barcode attached thereto is registered, the operator has conventionally been pressing the product buttons displayed on the screen of the POS terminal while uttering the product names and, in some cases, the number of sales products etc. to register the product information in order to have a customer confirm that there is no mistake in the product names relating to the products purchased. At this time, an error in registering the product information may occur. In addition, when the operator is not skilled enough, it takes time to register the product information.

Accordingly, in the present invention, the product name in the voice of the operator saying the product name and the like is voice-recognized, and the voice-recognized product name is compared with the product name input by the operator pressing the product button. By doing so, errors in inputting product names can be prevented, and thus errors in registering the product information can be prevented.

Embodiment of the Present Invention

Next, an embodiment of the present invention will be described by using a specific example of product information registration at the time of performing sales processing of products for sale at a bread store.

Configuration Example of Embodiment

Figure 1:
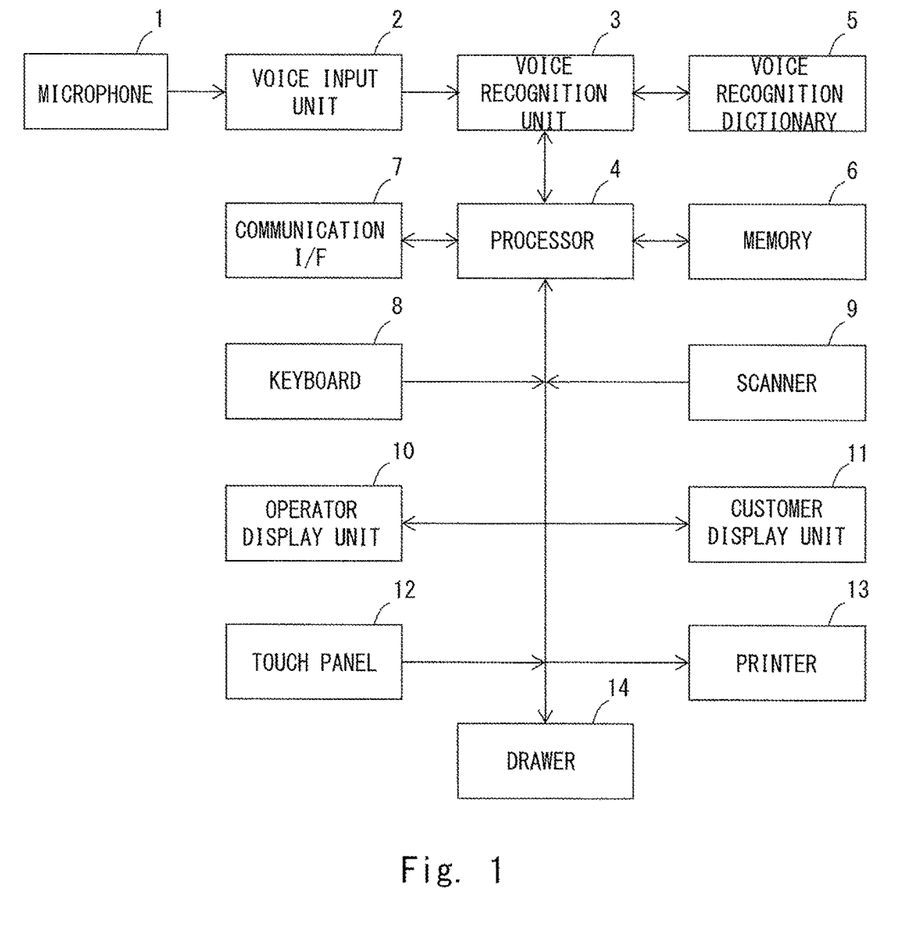
FIG. 1 is a block diagram showing an example of a configuration of a POS terminal according to the present invention.

Firstly, a configuration example of a POS terminal according to an embodiment of the present invention will be described with reference to FIG. 1. FIG. 1 is a block diagram showing an example of the configuration of the POS terminal according to the present invention.

Specifically, a POS terminal 100 shown in FIG. 1 is configured to include a microphone 1, a voice input unit 2, a voice recognition unit 3, a processor 4, a voice recognition dictionary 5, a memory 6, a communication I/F (interface) 7, a keyboard 8, a scanner 9, an operator display unit 10, a customer display unit 11, a touch panel 12, a printer 13, and a drawer 14. Note that arrow lines represent electrical connection.

A voice uttered by an operator (clerk) is input to the microphone 1. The voice input unit 2 converts the voice input to the microphone 1 into digital voice information. The voice recognition unit 3 extracts a product name included in the digital voice information converted by the voice input unit 2, compares the extracted product name with product names for voice recognition that are previously registered in the voice recognition dictionary 5, and notifies the processor 4 of the product name for which a match was found as a voice-recognized product name.

Further, the processor 4 operates based on a control program stored in the memory 6 and controls the POS terminal 100 as a whole. Note that the memory 6 stores, in addition to the control program, a PLU (Price Look Up) file for previously registering information such as product names, product codes, product classifications, sales prices (unit prices), and the like relating to all the products for sale at a store, i.e., product information, a sales registration file for registering sales results of the respective products, i.e., sold product data, and a product button product name association table for associating product buttons with the respective product names.

The POS terminal 100 performs data communication with a higher-level device (not shown in FIG. 1) and the like via a LAN (Local Area Network) line or the like by using the communication I/F 7. The keyboard 8 has various keys (numeric keys, cancel key, clear key, total key, close key, etc.) arranged thereon that are to be operated by the operator, converts key information operated by the operator into digital information, and notifies the processor 4 of the digital information. The scanner 9 reads barcodes attached to the products, converts the read barcodes into digital information, and notifies the processor 4 of the digital information. The scanner 9 is not necessarily included.

On the operator display unit 10, information such as the product names and sales prices (unit prices) of the products the customer intends to purchase and information such as a calculated total price are displayed. On the customer display unit 11, information such as the product names, sales price (unit prices), total price, and the like of sale items is displayed. The touch panel 12 is attached to the operator display unit 10, and detects a pressing operation by the operator on the product button and notifies the processor 4 of the detection.

The printer 13 prints a receipt or the like to be handed over to the customer. Cash and the like received from the customer are stored in the drawer 14.

Description of Operation Example of Embodiment

Next, an example of the operation relating to the POS terminal 100 illustrated in FIG. 1 will be described in detail.

First, a flow of, at the time of performing the sales processing, registration of the product information relating to sales products (bread) by the POS terminal 100 in a type of a store where the customer selects a desired product(s) (bread) from among the products (bread) displayed on the product shelves, places it on a tray, moves to a place where the POS terminal 100 is installed (cash register), and make a payment (sales processing) will be described.

Figure 2:
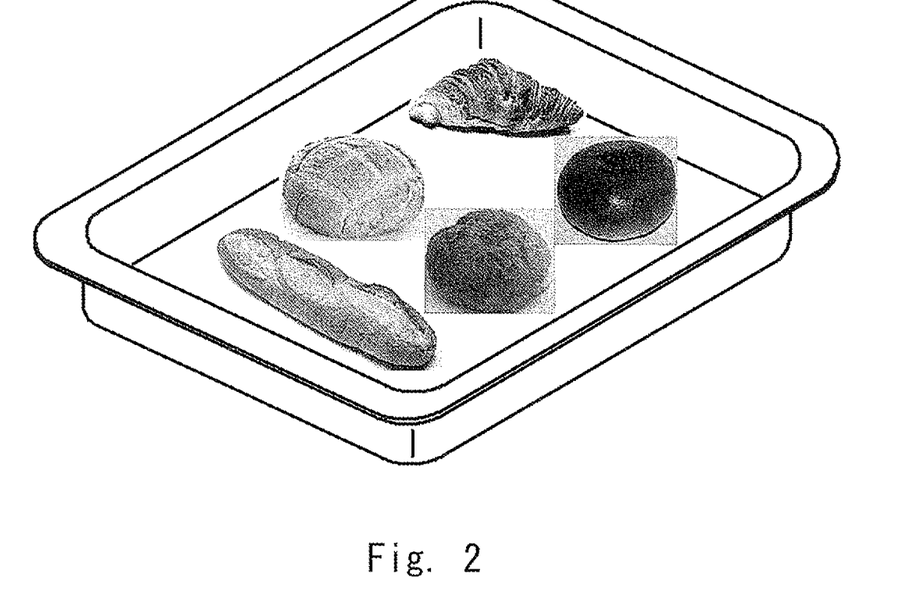
FIG. 2 is an explanatory diagram showing an example of a state where products (bread) that a customer intends to purchase are placed on a tray.

Commonly, in a bread store (bakery), the product shelves displaying products (bread) and the place where the POS terminal 100 is installed (cashier counter) for the customers to make a payment are arranged in the store. When the customer selects the products (bread) that the customer intends to purchase from among the products (bread) displayed on the product shelves, he or she repeats a movement of selecting the product(s) (bread) and placing it on the tray. As shown in FIG. 2, when the customer places all the products (bread) to purchase this time on the tray, he or she moves to the place where the POS terminal 100 is installed (cashier counter) in order to make a payment. FIG. 2 is an explanatory diagram showing an example of a state where products (bread) that the customer intends to purchase are placed on a tray.

Figure 3A:
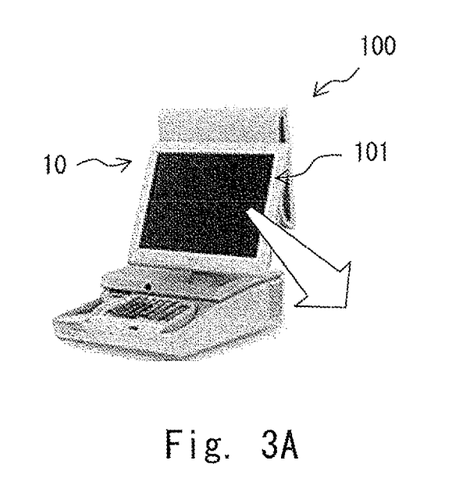
FIG. 3A is an explanatory diagram showing an example of product buttons displayed on a screen of an operator display unit of the POS terminal installed in a bread store.
Figure 3B:
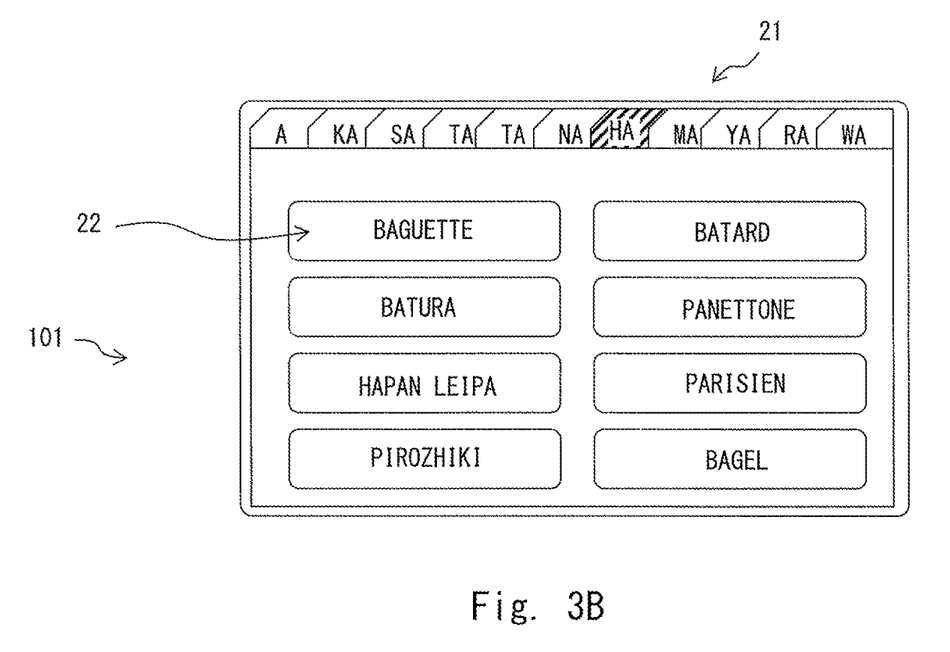
FIG. 3B is an explanatory diagram showing examples of product buttons displayed on a screen of an operator display unit of the POS terminal installed in a bread store.

As shown in FIGS. 3A and 3B, on a screen of the operator display unit 10 of the POS terminal 100 installed in the bread store (bakery), product buttons 22 for inputting the product names of the products (bread) can be displayed for the respective product. FIGS. 3A and 3B are explanatory diagrams showing examples of the product buttons displayed on the screen of the operator display unit 10 of the POS terminal 100 installed in the bread store. FIG. 3A is a perspective diagram of the POS terminal 100. FIG. 3B shows a display example of the products (bread) that start with the letter "ha" as examples of the product buttons displayed on a screen 101 of the operator display unit 10 of the POS terminal 100 shown in FIG. 3A.

That is, as shown in FIG. 3B, on the upper side of the screen 101 of the operator display unit 10 of the POS terminal 100, classification sheets 21 for categorizing the product names into "a" to "wa" lines based on the first letters of the product names are arranged and displayed. For example, when the classification sheets 21 for the "ha" line is selected, as shown in the example of FIG. 3B, a list of the product buttons 22 for registering the product information relating to the respective products (bread) whose product names start with "ha" are displayed.

The customer moves to the place where the POS terminal 100 is installed in order to make a payment and hands the tray carrying the product(s) (bread) selected in an attempt to purchase to the operator (store clerk) of the POS terminal 100. The operator (clerk) of the POS terminal 100 who has received the tray registers the product information relating the products (bread) on the tray by the POS terminal 100 as follows in order to perform the sales processing. The operator (clerk) visually checks the products (bread) on the tray, and in order to have the customer confirm whether or not there is no mistake in the registration operation of the product information relating the products, the operator (clerk) utters the product name of the product (bread) and also presses a product button 22*a* (see FIG. 4 which will be described later) from among the list of the product buttons 22 on the screen 101 of the operator display unit 10 of the POS terminal 100.

Figure 4:
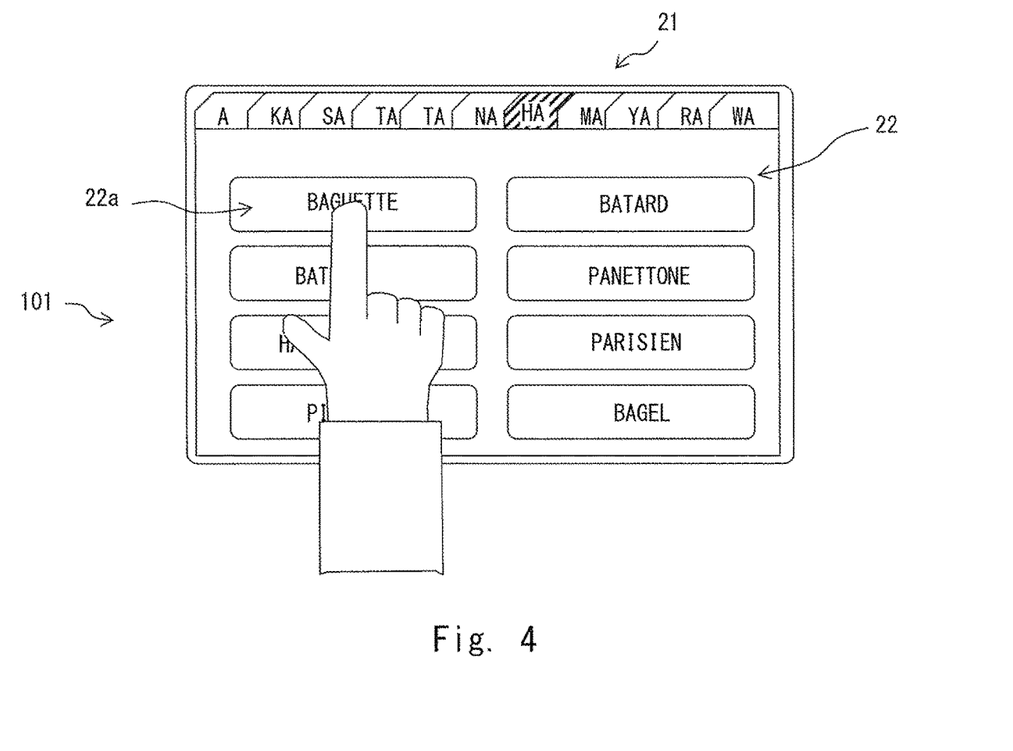
FIG. 4 is an explanatory diagram for describing an example of an operation in which an operator is pressing one of the product buttons in order to input a product name of a product for sale (bread).

That is, the operator (clerk) of the POS terminal 100 utters the product name and the like of the product (bread) on the tray, and also selects the classification sheet 21 on which the product button of the corresponding product (bread) appears from among the classification sheets 21 displayed on the upper side of the screen 101 of the operator display unit 10 of the POS terminal 100, so that the list of the products buttons 22 is displayed on the screen. After that, as shown in FIG. 4, by pressing the product button 22*a* corresponding to the product (bread) displayed on the screen, the product name of the product (bread) is input. FIG. 4 is an explanatory diagram for describing an example of an operation in which the operator is pressing the product button 22*a* in order to input the product name of the product for sale (bread). FIG. 4 illustrates an example in which the product (bread) to be sold is "Baguette", and the operator presses the product button 22*a* corresponding to the "Baguette".

Although details will be described later, the comparison with the product name uttered by the operator (clerk) is performed prior to the registration of the product information. That is, the product information relating to the product (bread) is only registered if both the product name uttered by the operator (clerk) and the product name of the pressed product button 22*a* match. If the two product names do not match, it is the case that the incorrect product button 22*a* has been pressed, the case that the product name uttered is incorrect, or the case that the voice has been unrecognizable. In such a case, the product information relating to the product (bread) will not be registered and instead the registration operation of the product (bread) is performed again.

When the registration of the product information relating to all the products (bread) on the tray is completed, the operator presses the total key for calculating a total amount of the products to purchase by the customer, so that the total amount is displayed on a screen of the customer display unit 11 (at this time, the product names, unit prices, and the like may also be displayed on the screen) to be presented to the customer. While the customer who has confirmed the total amount prepares cash for payment, the operator (clerk) performs a task of packing all the products (bread) purchased by the customer into a shopping bag or shopping box, and then the operator (clerk) receives the cash for the payment, inputs the received amount, and presses the close key (key indicating closing processing) in order to calculate an amount of change. Then, the operator (clerk) hands over the shopping bag or shopping box to the customer along with the receipt output by the printer and the change. After that, the operator (clerk) stores the received cash in the drawer 14 of the POS terminal 100, and ends the sales processing for one customer.

Figure 5:
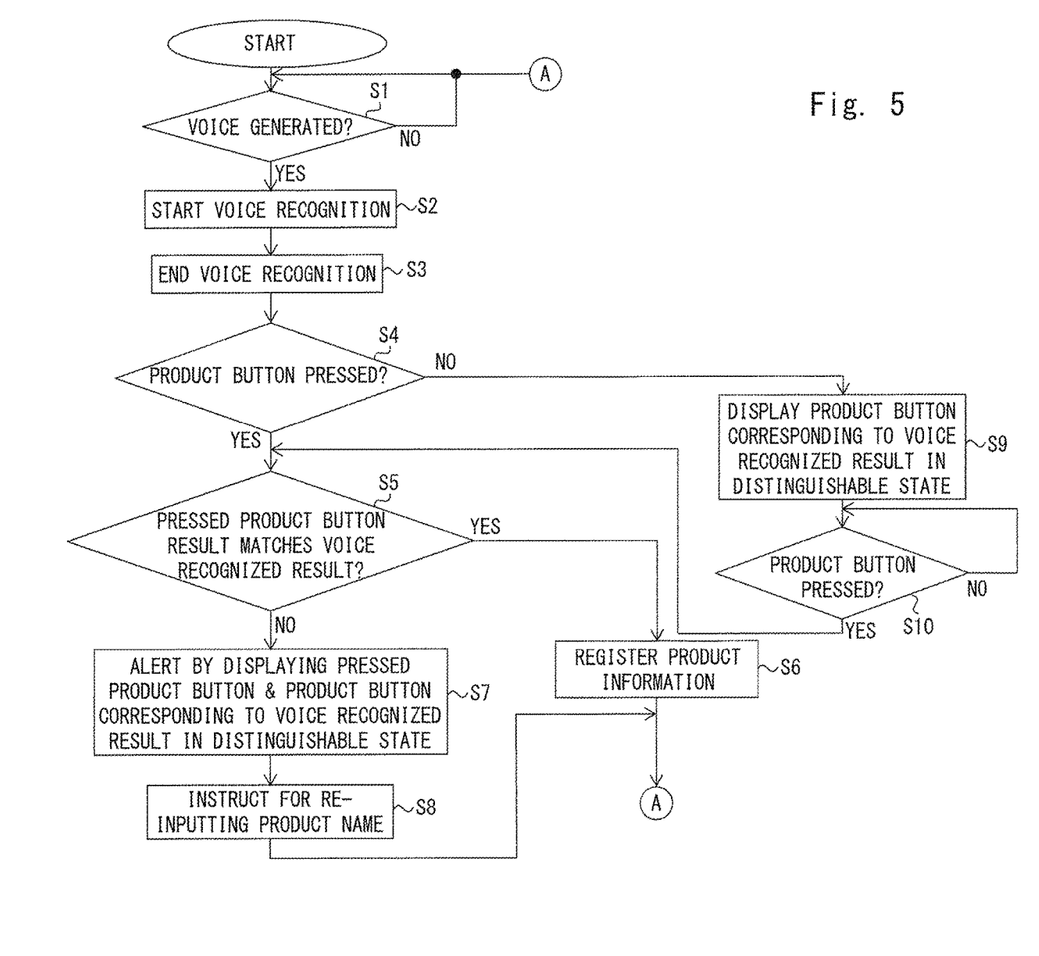
FIG. 5 is a flowchart showing a product information registration process by the POS terminal shown in FIG. 1.

Next, an example of the product information registration process at the time of performing the sales processing by the POS terminal 100 shown in FIG. 1 will be described in detail with reference to a flowchart of FIG. 5. FIG. 5 is the flowchart for describing a process carried out when the product information of the product is registered by the POS terminal 100 shown in FIG. 1.

When the customer moves to the place where the POS terminal 100 is installed to make a payment and hands over the tray carrying the products (bread) selected for purchase to the operator (clerk) of the POS terminal 100, as described above, the operator (clerk) of the POS terminal 100 visually checks the products (bread) on the tray and utters the product name of one of the products. The voice of the operator is input to the voice input unit 2 via the microphone 1 of the POS terminal 100, converted into the digital voice information, and transferred to the voice recognition unit 3 (YES in Step S1).

When the digital voice information converted by the voice input unit 2 is transferred to the voice recognition unit 3, the voice recognition unit 3 extracts information on the product name included in the converted digital voice information, compares the extracted product name with the product names for voice recognition that are previously registered in the voice recognition dictionary 5, thereby starting the voice recognition operation for detecting the product name relating to the product (Step S2). When the product name in the voice recognition dictionary 5 matching the product name included in the digital voice information is detected, it means that the product corresponding to the uttered product name has been identified, and the voice recognition operation is ended (Step S3). If there is no product name matching the information on the product name included in the digital voice information in the voice recognition dictionary 5, the process returns to Step S1 (which is not shown in the flowchart of FIG. 5).

As a result of the voice recognition operation, when the product name of the product (bread) is identified, the processor 4 which has received the notification of the identified product then checks, based on data on the touch panel 12, as to whether or not the operator has pressed the product button 22 corresponding to one of the products from among the product buttons 22 displayed on the screen 101 of the operator display unit 10 (Step S4).

When the processor 4 detects the pressing operation by the operator on any one of the product buttons 22 (YES in Step S4), the processor 4 identifies the product name corresponding to the product button 22 pressed by the operator by referring to the product button product name association table, compares the identified product name with the product name voice-recognized by the voice recognition unit 3, and checks as to whether or not the two product names match (Step S5). When the product name corresponding to the product button 22 pressed by the operator matches the product name voice-recognized by the voice recognition unit 3 (YES in Step S5), the processor 4 refers to the PLU file and registers the product information (product name, number of the products, sales price etc.) of the product having the product name in a pre-closing processing product area of the sales registration file in the memory 6 (Step S6). Then, the process returns to Step S1 in order to register the product information of the next product (bread). Note that if there are a plurality of the products, the number of the products may be input by using the keyboard. Moreover, when the product information (product name, number of the products, sales price, etc.) of the product (bread) is registered in the pre-closing processing product area of the sales registration file, the product name and the like are displayed on the screen 101 of the operator display unit 10.

On the other hand, if the product name corresponding to the product button 22*a* pressed by the operator does not match the product name voice-recognized by the voice recognition unit 3 (NO in Step S5), states (modes) of the product button 22 pressed by the operator and the product button 22 corresponding to the product name voice-recognized by the voice recognition unit 3 are made distinguishable from those of other product buttons to be displayed on the screen 101 of the operator display unit 10, thereby alerting the operator that an input error has occurred (Step S7). After that, an instruction for requesting the operator to re-input the product name is displayed on the screen 101 of the operator display unit 10 (Step S8), and the process returns to Step S1.

In this case, in Step S7, as the information indicating detailed contents of the occurrence of the input error, for example, the respective product buttons 22 corresponding to the product names are changed to predetermined different modes to be displayed on the screen of the operator display unit 10. The different modes include changed colors of the product buttons, changed patterns of the product buttons, blinking product buttons, increased sizes of the product buttons, or the like. Further, in Step S8, instead of displaying the instruction for requesting the operator to re-input the product name on the screen 101 of the operator display unit 10, a predetermined alert sound may be output or the predetermined alert sound may be output while displaying the instruction for requesting the operator to re-input the product name on the screen 101 of the operator display unit 10 in order to alert the operator.

When the operator visually confirms an alarm notification of the instruction for requesting the operator to re-input the product name that is displayed on the screen of the operator display unit 10 or when the operator confirms the sounding of the alert sound for instructing the operator to re-input the product name, the operator utters the product name of the product again in order to redo the registration operation relating to the product which the operator intends to register.

In Step S4, if there has been no pressing operation by the operator on any of the product buttons 22 (NO in Step S4), the processor 4 makes the state (mode) of the product button 22 corresponding to the product name voice-recognized by the voice recognition unit 3 distinguishable from those of the other product buttons 22 to be displayed on the screen 101 of the operator display unit 10 (Step S9). Making the state (mode) of the product button 22 that should be pressed distinguishable from those of the other product buttons 22 includes, for example, changing the pattern of the product button 22 to a predetermined different pattern, changing a display color of the product button 22, and the like.

The operator presses a product button 22c. When the processor 4 detects the pressing operation on the product button 22c, the process proceeds to Step S5 (YES in Step S10), and the voice recognition unit 3 performs the operation for comparing the product name corresponding to the product button 22 pressed by the operator with the product name relating to the product voice-recognized by the voice recognition unit 3.

Figure 6:
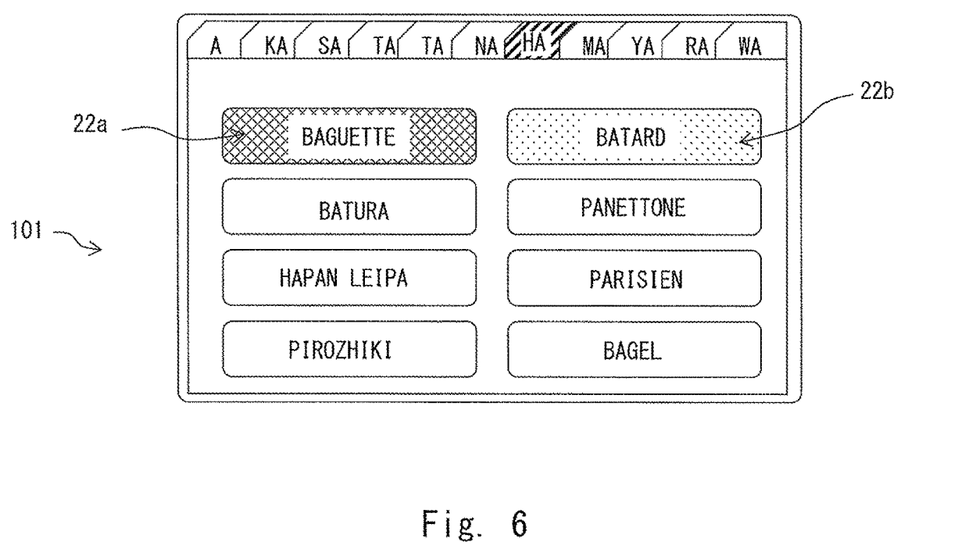
FIG. 6 is an explanatory diagram showing an example in which, when a product name corresponding to the product button pressed by the operator does not match a voice-recognized product name, the screen is displayed with a different mode of the product buttons.

In Step S7 of FIG. 5, the operator is alerted that the product name corresponding to the product button 22a pressed by the operator does not match the product name voice-recognized by the voice recognition unit 3, and thus an input error has occurred. An example in such a case will be described with reference to FIG. 6. In this example, the states (modes) of the product button 22 corresponding to the product name pressed by the operator and the product button 22 corresponding to the product name voice-recognized by the voice recognition unit 3 are made distinguishable from those of the other product buttons 22. Then, the product buttons 22 are displayed on the screen of the operator display unit 10. FIG. 6 is an explanatory diagram showing an example in which, when the product name corresponding to the product button 22 pressed by the operator does not match the product name voice-recognized by the voice recognition unit 3, the patterns of these product buttons 22 are changed from the normal state in order to indicate specific information enabling the input error by the operator to be distinguished to be displayed on the screen of the operator display unit 10.

In the screen display example shown in FIG. 6, while the product buttons 22 are normally plain, the product button 22a for "Baguette" pressed by the operator is displayed in a diagonal grid pattern as shown in the upper left of the screen. On the other hand, in the example shown in FIG. 6, the product button 22b for "Batard" corresponding to the voice-recognized product name is displayed in a dotted pattern as shown in the upper right of the screen.

Note that in the screen display example shown in FIG. 6, both the product button 22a pressed by the operator and the product button 22b corresponding to the voice-recognized product name are present on the same classification sheet for "ha" line. However, the present invention is not limited to this case, and the product buttons 22a and 22b may be present on different classification sheets. If the product buttons 22a and 22b are present on different classification sheets, the classification sheet containing one of the product buttons 22 (e.g., product button 22a pressed by the operator) is displayed on the screen of the operator display unit 10, and the other product button 22 (e.g., product button 22b corresponding to the voice-recognized product) is displayed on a divided part of the screen. Alternatively, information indicating the classification sheet containing the other product button 22 (e.g., product button 22b corresponding to the voice-recognized product) may be additionally displayed on the classification sheet containing the one of the product buttons 22 (e.g., product button 22a pressed by the operator).

Moreover, the screen display of FIG. 6 shows the example in which the patterns of the product button 22a pressed by the operator and the product button 22b corresponding to the voice-recognized product name are changed to the predetermined patterns, respectively, and the product buttons 22a and 22b are displayed in the state distinguishable from those the other product buttons 22. However, any display method including changing the patterns may be employed as long as the product buttons 22a and 22b can be easily distinguished from the other product buttons 22. For example, the product buttons 22a and 22b may be made distinguishable from the other product buttons 22 by changing the colors of the product buttons, blinking the product buttons, increasing the sizes of the product buttons, or the like to be displayed on the screen.

Figure 7:
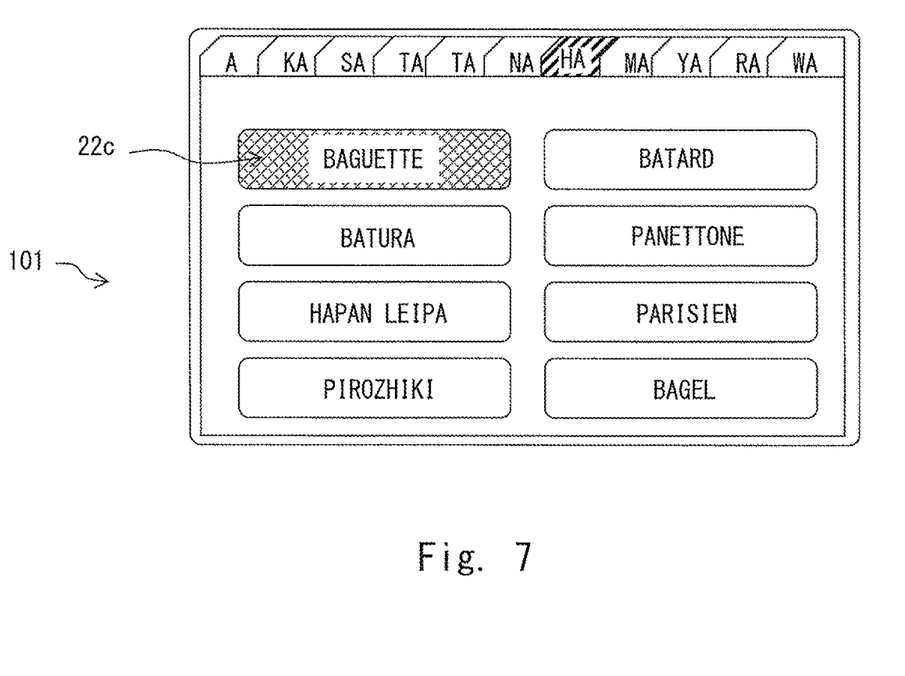
FIG. 7 is an explanatory diagram for describing an example in which a mode of the product button corresponding to a voice-recognized product name is changed and displayed on the screen in order to make it possible to distinguish the product button which a pressing operation by the operator is delayed from other product buttons.

Next, in Step S9 of FIG. 5, an example will be described with reference to FIG. 7. In this example, there has been no pressing operation by the operator on any of the product buttons 22 even after the voice recognition has been completed. Then, the product button 22c corresponding to the voice-recognized product name is displayed on the screen of the operator display unit 10. FIG. 7 shows an example in which, when there is a delay in the pressing operation by the operator on the product button 22, the pattern of the product button 22c corresponding to the voice-recognized product name is changed from the normal state to be displayed on the screen of the operator display unit 10. By such a display, the operator is prompted to select and immediately press the product button 22c corresponding to the voice-recognized product.

The screen display of FIG. 7 shows the example in which the product buttons 22 are normally plain whereas, due to a delay in the pressing operation by the operator, the product button 22c for "Baguette" that should be immediately pressed by the operator is displayed in the diagonal grid pattern as shown in the upper left of the screen.

Thus, the operator confirms, on the operator display unit 10, that the product name corresponding to the product button 22c whose pattern has been changed to the diagonal grid pattern and that is displayed on the screen matches the product name of the product which the operator intends to register the product information thereof, and then presses the product button 22c corresponding to the correct product name. In this manner, it is possible to support the product information registration operation by the operator and to register the correct product information quickly. Such an operation is especially useful for operators with insufficient skills.

The screen display of FIG. 7 shows the example in which the classification sheet containing the product button 22c that should be immediately pressed by the operator is displayed on the screen of the operator display unit 10. However, it should be noted that if the classification sheet containing the product button 22c is not displayed on the screen, the classification sheet is automatically switched to the one containing the product button 22c and displayed on the screen of the operator display unit 10.

Moreover, the screen display of FIG. 7 shows the example where the pattern of the product button 22c on which the pressing operation by the operator is delayed is changed to a predetermined pattern and displayed on the screen in the state distinguishable from those of the other product buttons 22. However, any display method including changing the pattern may be employed as long as the product button 22c can be easily distinguished from the other product buttons 22. For example, the state (mode) of the product button 22c may be made distinguishable from those of the other product buttons 22 by changing the color of the product button, blinking the product button, increasing the size of the product button, or the like to be displayed on the screen.

Further, in the flowchart of FIG. 5, if the product name corresponding to the product button 22a pressed by the operator does not match the product name voice-recognized by the voice recognition unit 3 (NO in Step S5), the operator is alerted that the input error by the operator has occurred (Step S7). After that, the instruction for requesting the operator to re-input the product name is displayed on the screen 101 of the operator display unit 10 in order to resolve the input error (Step S8). However, the present invention may be configured as follows.

For example, when the operator determines that the voice-recognized product name is correct but there is an error in the pressing operation on the product button 22, the operator may select the product button 22a again corresponding to the correct product name and press the product button 22 instead of returning the process to Step S1. After that, the process may return to Step S5, and the comparison between the product name corresponding to the pressed product button 22 and the product name voice-recognized by the voice recognition unit 3 may be performed.

Conversely, when the operator determines that the pressed product button 22a is correct but the voice-recognized product name is incorrect, the operator may skip the re-pressing operation on the product button 22a and only utter the product name again.

Description of Other Embodiments

Figure 8:
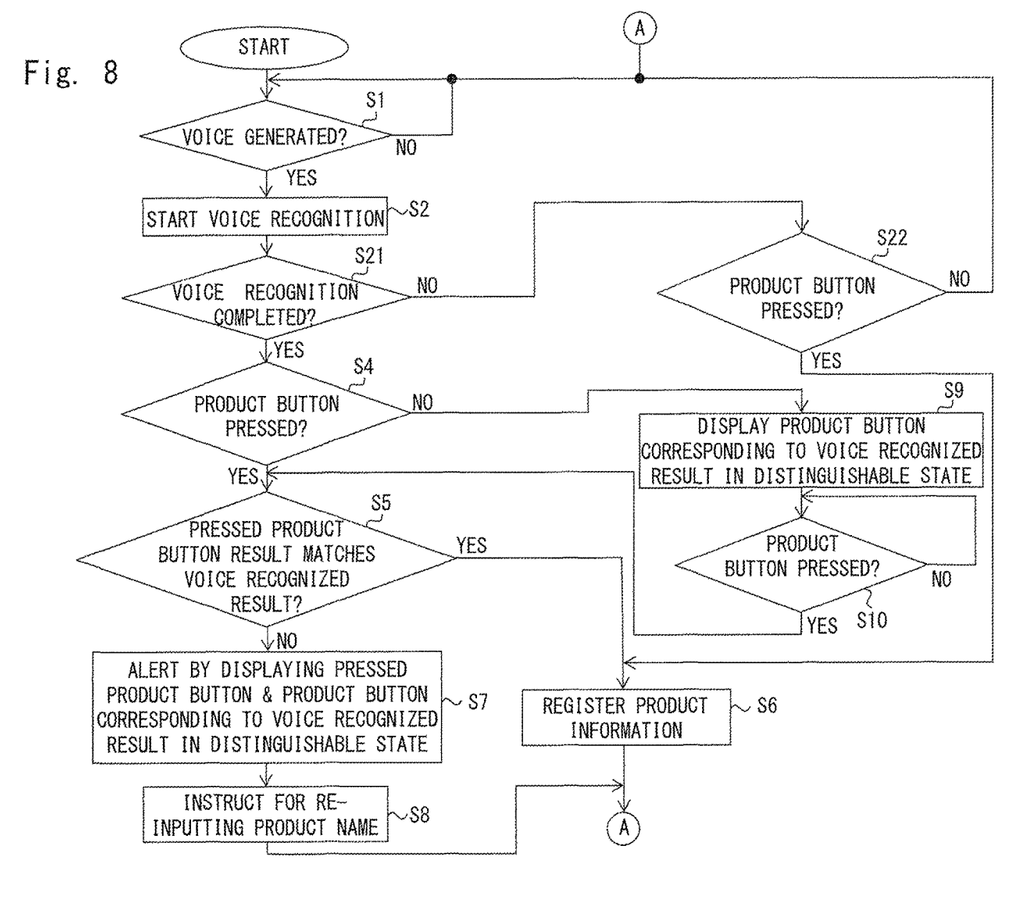
FIG. 8 is a flowchart for describing another example of the product information registration process by the POS terminal shown in FIG. 1.

In the above-described flowchart of FIG. 5, the case where it is confirmed that the product name uttered by the operator is registered in the voice recognition dictionary 5, and the voice recognition unit 3 is able to voice-recognize the product name uttered by the operator has been described. The following is a description of an example of a process when the voice recognition unit 3 cannot recognize the product name uttered by the operator with reference to a flowchart of FIG. 8. FIG. 8 is a flowchart for describing another example of the registration process of the product information by the POS terminal 100 shown in FIG. 1. FIG. 8 shows an example of a process including a case when the product name uttered by the operator cannot be voice-recognized by the voice recognition unit 3.

The only difference between the flowchart of FIG. 8 and the above-described flowchart of FIG. 5 is the decision boxes in Steps S21 and S22 of FIG. 8, and steps other than these steps are identical to those in FIG. 5. Note that Step S3 in FIG. 5 is replaced by Step S21 in FIG. 8, and Step S22 in FIG. 8 is a step additionally included in the steps in the flowchart of FIG. 5. In the following description, the steps for performing a process different from that in the flowchart of FIG. 5 will be described.

In Step S2 of the flowchart shown in FIG. 8, the voice recognition unit 3 starts the voice recognition process that detects, from among the product names registered in the voice recognition dictionary 5, the same product name as the product name included in the digital voice information that is obtained as a result of the operator uttering the product name. Then the process proceeds to Step S21 where it is confirmed whether or not the product name corresponding to the uttered product name is registered in the voice recognition dictionary 5, that is, whether or not the voice recognition process has been successfully completed (step S21). When it is confirmed that the voice recognition process is completed (YES in Step S21), the process proceeds to Step S4. After this, the same process as that of the flowchart of FIG. 5 is performed. On the other hand, if the voice recognition process has not been successfully completed (NO in Step S21), the process proceeds to Step S22 that is a new step added in FIG. 8.

In this example, in the voice recognition process performed by the voice recognition unit 3 in Steps S2 and S21, the voice recognition unit 3 performs a process of evaluating as to whether or not the product name for voice recognition included in the digital voice information of the voice uttered by the operator is completely identical to the product name registered in the voice recognition dictionary 5.

For example, there are three kinds of voice recognition methods shown in the following (A), (B), and (C), when the voice recognition is performed in order to distinguish between the product names and identify a product.

(A) "Forward comparison" method: A product name that is input by voice is compared with the voice recognition dictionary 5 sequentially from the first letter until the product can be identified.

(B) "Syllable match" method: The product name that is input by voice is compared with the voice recognition dictionary 5 by each syllable in order to identify the product.

(C) "Exact match" method: The whole product name that is input by voice is compared with the voice recognition dictionary 5 in order to identify the product.

In the case of identifying a product by distinguishing between the product names of the products (bread), for example, "pain au chocolat" and "pain au levain", in each of the above three types of voice recognition methods, the underlined parts shown in the following table 1 are used to perform the voice recognition in order to identify the product.

TABLE 1

| Product name | (A) Example where product is identified by sequentially comparing product names from a first letter (forward comparison) | (B) Example where a product is identified by comparing product names by each syllable (syllable match) | (C) Example where a product is identified when there is an exact match of a voice-input product name |
|---|---|---|---|
| Pain au chocolat | <u>Pain au chocolat</u><br><u>Pain</u> au chocolat | Pain au chocolat | <u>Pain au chocolat</u> |
| Pain au levain | <u>Pain au levain</u><br><u>Pain</u> au <u>levain</u> | Pain au <u>levain</u> | <u>Pain au levain</u> |

Note:
Underlined parts have been recognizable

In the method (A), the "forward comparison" method, the product "pain au chocolat" can be identified by comparing the voice-input product name with the voice recognition dictionary 5 from the first letter up to "pain au ch" or "pain ch". Further, the product "pain au levain" can be identified by comparing the voice-input product name with the voice-recognition dictionary 5 from the first letter up to "pain au le" or "pain e".

In the method (B), the "syllable comparison" method, the syllable "chocolat" is compared with the voice recognition dictionary 5, and then the product "pain au chocolat" can be identified. Further, the syllable "levain" is compared with the voice recognition dictionary 5, and then the product "pain au levain" can be identified.

In the method (C), the "exact match" method, the whole product name included in the voice input, "pain au chocolat", is compared with the product names in the voice recognition dictionary 5, and then the product "pain au chocolat" can be identified. Further, the whole product name included in the voice input, "pain au levain", is compared with the product names in the voice recognition dictionary 5, and then the "pain au levain" can be identified. This "exact match" method is employed in this embodiment.

Returning to the description of the flowchart shown in FIG. 8, if the voice recognition process has not been successfully completed in Step S21 (NO in Step S21), and the process proceeds to Step S22, the processor 4 then checks, based on the data on the touch panel 12, as to whether or not the product button 22a relating to any one of the products has been pressed by the operator from among the product buttons 22 that are displayed on the screen 101 of the operator display unit 10 (Step S22).

When the processor 4 detects a pressing operation by the operator on the product button 22a (YES in Step S22), the process proceeds to Step S6, assuming that the product button 22 pressed by the operator corresponds to the correct product name. Then, the product information of the product having the product name corresponding to the product button is registered.

On the other hand, if there has not been a pressing operation by the operator on the product button 22a (NO in Step S22), the process returns to Step S1.

That is, in the flowchart of FIG. 8, if the voice recognition unit 3 could not detect a product name matching the product name uttered by the operator as a result of searching in the voice recognition dictionary 5, and could not recognize the product name uttered by the operator, the result of the voice recognition will not be used and instead the product information of the product having the product name corresponding to the product button 22 pressed by the operator will be registered. That is, as described above, since the exact match method for finding an exact match between the product name uttered by the operator and the product name registered in the voice recognition dictionary 5 is employed as the voice recognition method of the voice recognition unit 3, when the voice recognition could not be successfully completed, and thus the product name could not be identified, no special operation regarding the voice recognition will be performed. The reason for such a process is because of the circumstances that it is difficult with the current voice recognition technology to achieve the voice recognition rate of 100%, and that skilled operators would register the product information much faster with a very few registration errors by pressing the product buttons 22 than using the voice recognition which takes some time.

Since the "exact match" method is employed, if the operator is uttering words other than the product names, the words will not exactly match the product names as a result of the voice recognition operation by the voice recognition unit 3, and thus the words will be ignored. Therefore, it is not necessary to prepare a special button operation such as a voice recognition start button in order to instruct the voice recognition unit 3 to start the voice recognition operation. That is, each time the digital voice information is input from the voice input unit 2, the voice recognition unit 3 automatically starts the voice recognition operation.

Although, in the above-described other embodiments, the "exact match" method is employed, the "forward comparison" method or the "syllable match" method may be employed.

Moreover, in the above-described embodiment and other embodiments, the product names are described as "pain au chocolat" and the like, but the product names are not limited to them. For example, the product names may be "first", "second", . . . , "number 1", "number 2" . . . or the like.

Description of Effects of Embodiments

As described in detail above, in this embodiment, the following effects can be achieved.

Firstly, when the operator registers the product information relating to the product for sale by the POS terminal 100, the result of the voice recognition of the product name uttered by the operator is compared with the input result of the product name obtained by the operator pressing the product button 22, and if both the product names match, the product information is registered. This contributes to preventing errors in registering the product information relating to the product for sale from occurring.

Secondly, when the product name obtained by the pressing operation on the product button 22 differs from the product name obtained as the result of the voice recognition due to an operation error by the operator, the pressed product button 22 and the product button 22 corresponding to the result of the voice recognition are displayed on the screen in the modes different from those of the other product buttons to be presented to the operator, and the alert indicative of the operation error is output. This enables the operator to easily correct the operation error.

Thirdly, when there has been no pressing operation by the operator on the product buttons even after the voice recognition for the product name uttered by the operator has been completed, the product button 22 displayed on the screen 101 of the POS terminal 100 is displayed in the mode distinguishable from those of the other product buttons 22 according to the result of the voice recognition. This enables the operator, even those who are not familiar with the operation of the POS terminal 100, to immediately recognize the product button 22 that should be pressed, thereby reducing a waiting time for the customer. Supporting the operator to select the product button 22 by the voice recognition can hopefully improve the skills of the operators in the tasks relating to the POS terminal 100.

Preferred embodiments of the present invention have been described so far. However, it should be noted that the embodiments are merely illustration of the present invention and do not limit the present invention in any way. Those skilled in the art would easily understand that various modifications and changes can be made according to particular usages without departing from the scope of the present invention.

Although the present invention has been described with reference to the embodiments, the present invention is not limited by the above. Various modifications and changes, understood by those skilled in the art within the scope of the present invention, can be made to the configurations and details of the present invention. For example, in the above embodiments, the present invention is described as a configuration of hardware, however the present invention is not limited to this. In the present invention, the processes can be achieved by causing a CPU (Central Processing Unit) to execute a computer program.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present application is based upon and claims the benefit of priority from Japanese Patent Application No. 2015-034190, filed on Feb. 24, 2015, the entire contents of which are hereby incorporated by reference.

REFERENCE SIGNS LIST

1 MICROPHONE
2 VOICE INPUT UNIT
3 VOICE RECOGNITION UNIT
4 PROCESSOR
5 VOICE RECOGNITION DICTIONARY
6 MEMORY
7 COMMUNICATION I/F
8 KEYBOARD
9 SCANNER
10 OPERATOR DISPLAY UNIT
11 CUSTOMER DISPLAY UNIT
12 TOUCH PANEL
13 PRINTER
14 DRAWER
100 POS TERMINAL
101 SCREEN
21 CLASSIFICATION SHEET
22 PRODUCT BUTTON
22a PRODUCT BUTTON (PRODUCT BUTTON PRESSED BY OPERATOR)
22b PRODUCT BUTTON (PRODUCT BUTTON CORRESPONDING TO VOICE-RECOGNIZED PRODUCT NAME)
22c PRODUCT BUTTON (PRODUCT BUTTON PROMPTING OPERATOR TO PRESS)

The invention claimed is:

1. A POS terminal comprising:
a voice recognition dictionary including product names of products for sale registered therein;
voice recognition unit configured to search for a product name included in a voice uttered by an operator in the voice recognition dictionary, and for outputting, when the product name included in the voice matches one of the product names registered in the voice recognition dictionary, the product name included in the voice as a voice-recognized product name; and
display unit with a touch panel configured to display product buttons for the operator to press in order to input the product name of the product for sale,
wherein the product name voice-recognized by the voice recognition unit is compared with a product name of a product button pressed by the operator from among the product buttons displayed on the display unit, and when the voice-recognized product name matches the product name of the pressed product button, product information of a product having the matched product name is registered,
wherein if the voice-recognized product name differs from the product name of the pressed product button, a product button corresponding to the voice-recognized product name and the pressed product button are displayed on the display unit in modes distinguishable from those of the other product buttons.

2. The POS terminal according to claim 1, wherein the search for the product name included in the voice in the voice recognition dictionary by the voice recognition unit is started in response to an input of the voice uttered by the operator.

3. The POS terminal according to claim 1, wherein when the product button corresponding to the voice-recognized product name and the pressed product button are displayed on the display unity in the modes distinguishable from those of the other product buttons, an alert is displayed or an alert sound is output.

4. A POS terminal comprising:
a voice recognition dictionary including product names of products for sale registered therein;
voice recognition unit configured to search for a product name included in a voice uttered by an operator in the voice recognition dictionary and for outputting, when the product name included in the voice, matches one of the product names registered in the voice recognition dictionary, the product name included in the voice as a voice-recognized product name; and
display unit with a touch panel configured to display product buttons for the operator to press in order to input the product name of the product for sale,
wherein the product name voice-recognized by the voice recognition unit is compared with a product name of a product button pressed by the operator from among the product buttons name of the pressed product button, product information of a product having the matched product name is registered, wherein, if the product button has not been pressed when the product name voice-recognized by the voice recognition unit is output, the product button corresponding to the voice-recognized product name is displayed on the display unit in a mode distinguishable from those of the other product buttons.

5. A POS terminal comprising:

a voice recognition dictionary including product names of products for sale registered therein;

voice recognition unit configured to search for a product name included in a voice uttered by an operator in the voice recognition dictionary, and for outputting, when the product name included in the voice, matches one of the product names registered in the voice recognition dictionary, the product name included in the voice as a voice recognized product name; and display unit with a touch panel configured to display product buttons for the operator to press in order to input the product name of the product for sale, wherein the product name voice-recognized by the voice recognition unit is compared with a product name of a product button pressed by the operator from among the product buttons name of the pressed product button, product information of a product having the matched product name is registered, wherein, if the product button is pressed when the voice-recognized product name has not been output by the voice recognition unit, product information of a product having the product name corresponding to the pressed product button is registered.

6. The POS terminal according to of claim 1, wherein when the voice recognition unit searches for the product name included in the voice in the voice recognition dictionary, an exact match method where a match is found when the whole product name completely matches the product name in the voice recognition dictionary is performed.

* * * * *

UNITED STATES PATENT AND TRADEMARK OFFICE
CERTIFICATE OF CORRECTION

PATENT NO. : 10,453,045 B2
APPLICATION NO. : 15/528535
DATED : October 22, 2019
INVENTOR(S) : Kotaro Miyata and Daiki Chiba It is certified that error appears in the above-identified patent and that said Letters Patent is hereby corrected as shown below:

In the Claims

Column 16, Line 48; In Claim 3, delete "unity" and insert --unit-- therefor

Column 16, Line 56; In Claim 4, after "dictionary", insert --,--

Column 16, Line 57; In Claim 4, delete "voice," and insert --voice-- therefor

Column 16, Line 67; In Claim 4, after "buttons", insert --displayed on the display unit, and when the voice-recognized product name matches the product--

Column 17, Line 14; In Claim 5, delete "voice," and insert --voice-- therefor

Column 17, Line 17; In Claim 5, delete "voice recognized" and insert --voice-recognized-- therefor Column 18, Line 4; In Claim 5, after "buttons", insert --displayed on the display unit, and when the voice-recognized product name matches the product--

Signed and Sealed this
Twenty-fourth Day of November, 2020

Andrei Iancu
*Director of the United States Patent and Trademark Office*